United States Patent [19]

Shido et al.

[11] Patent Number: 5,323,003
[45] Date of Patent: Jun. 21, 1994

[54] SCANNING PROBE MICROSCOPE AND METHOD OF OBSERVING SAMPLE BY USING SUCH A MICROSCOPE

[75] Inventors: Shunichi Shido, Sagamihara; Toshihiko Miyazaki, Hiratsuka; Kunihiro Sakai, Isehara; Takahiro Oguchi, Ebina; Akihiko Yamano, Sagamihara, all of Japan

[73] Assignee: Canon Kabushiki Kaisha, Tokyo, Japan

[21] Appl. No.: 936,774

[22] Filed: Aug. 28, 1992

[30] Foreign Application Priority Data

Sep. 3, 1991 [JP] Japan ................... 3-252922

[51] Int. Cl.$^5$ ............................... H01J 37/26
[52] U.S. Cl. ..................... 250/306; 250/307; 73/105
[58] Field of Search .............. 250/306, 307; 73/105

[56] References Cited

U.S. PATENT DOCUMENTS 5,077,473 12/1991 Elings et al. ............. 250/307

FOREIGN PATENT DOCUMENTS 63-161552 7/1988 Japan ............... G11B 9/00
63-161553 7/1988 Japan ............... G11B 9/00

OTHER PUBLICATIONS

Binnig et al., "Scanning Tunneling Microscopy", Helvetica Physics Oeta, vol. 55, pp. 726-735 (1982).

*Primary Examiner*—Jack I. Berman
*Attorney, Agent, or Firm*—Fitzpatrick, Cella, Harper & Scinto

[57] ABSTRACT

A scanning probe microscope is provided with a probe, a scanning device, a detecting device and an output device. The probe is disposed to face the surface of a sample. The scanning device two-dimensionally scans the surface of the sample using the probe. A signal corresponding to the structure of the sample is detected from the probe by the detecting device. From the signal detected in the detecting device, an observation image of the sample is output by the output device. The apparatus is further provided with a correcting device for correcting the scan by the scanning device so that the observation image output from the outputting device is not shifted.

39 Claims, 6 Drawing Sheets

SCANNING PROBE MICROSCOPE AND METHOD OF OBSERVING SAMPLE BY USING SUCH A MICROSCOPE

BACKGROUND OF THE INVENTION

1. Field of the Invention

The invention relates to a scanning probe microscope for obtaining an observation image of a sample by using a physical phenomenon (for instance, a tunnel current or a force between atoms) which is observed when the probe approaches the sample and also relates to a method of observing the sample by using the scanning probe microscope.

2. Related Background Art

In recent years, there has been developed a scanning tunnel microscope (hereinafter, abbreviated to "STM") in which a probe and a sample are allowed to approach and electron structures of and near the material surface can be directly observed by using a tunnel phenomenon a physical phenomenon which occurs at this time (refer to G. Binning et al., "Helvetica Physica Acta", 55.726, 1982). A real spatial image can be measured at a high resolution irrespective of whether the sample is monocrystalline or amorphous. The STM also has an advantage in that the electron structures can be observed at low electric power without damaging the medium by a current. Further, the STM operates even in the atmosphere or in a solution as well as in an ultra-high vacuum and can be used for various materials. Applications in a wide range in the scientific or research field are expected. In the industrial field as well, in recent years, as disclosed in, for instance, JP-A-63-161552 and JP-A-63-161553, attention is paid to the principle that the STM has a spatial resolution of atomic or molecular size. Application to a recording and reproducing apparatus and the realization to put the STM into a practical use are vigorously being pursued.

Since the STM has a spatial resolution of molecular size, in the conventional STM apparatus, a stage or a probe causes a drift due to fluctuations of the temperature, vibrations, or influences of the driving system such as a piezoelectric actuator or the like, so that the probe scanning area on the sample surface is moved. Thus, there is a problem that an observation object moves with the lapse of time. Such a problem also occurs in other scanning probe microscopes, for example, an atomic force microscope (AFM).

SUMMARY OF THE INVENTION

It is an object of the invention to solve the problems of the conventional techniques and to provide a scanning probe microscope which can obtain a stable observation image of a sample and a method of observing the sample by using the scanning probe microscope.

A scanning probe microscope according to one embodiment to accomplish the above object of the invention comprises: a probe arranged so as to face the surface of a sample; scanning means for two-dimensionally scanning the surface of the sample using the probe; detecting means for detecting a signal corresponding to a structure of the sample from the probe; output means for generating an observation image of the sample from the signal detected by the detecting means; and correcting means for correcting the scan by the scanning means so that the observation image which is generated from the output means is not shifted.

A scanning probe microscope according to another embodiment of the invention comprises: a probe arranged so as to face the surface of a sample; driving means for relatively two-dimensionally moving the probe and the sample; a control circuit for generating a control signal to control the driving means; a detecting circuit to detect a signal corresponding to a structure of the sample from the probe; a data producing circuit to produce image data of the sample from the signal detected by the detecting circuit; an operating circuit for detecting a shift of the image by comparing at least a part of the image data with a reference value and for generating a correction signal to correct the shift; and a feedback circuit to feed the correction signal back to the control signal which is supplied from the control circuit to the driving means.

A method of observing a sample by the scanning probe microscope according to one embodiment of the invention comprises the steps of: two-dimensionally scanning the surface of a sample using a probe; detecting a signal corresponding to a structure of the sample from the probe; obtaining an observation image of the sample from the detected signal; and correcting the scan by the scanning means so that the observation image is not shifted.

A method of observing a sample by the scanning probe microscope according to another embodiment of the invention comprises the steps of: relatively two-dimensionally moving a probe and the sample in accordance with a control signal; detecting a signal corresponding to a structure of the sample from the probe; producing image data of the image from the detected signal; detecting the shift of the image by comparing at least a part of the image data with a reference value; producing a correction signal to correct the detected shift; and feeding the correction signal back to the control signal.

DETAILED DESCRIPTION OF THE PREFERRED EMBODIMENTS

Figure 1:
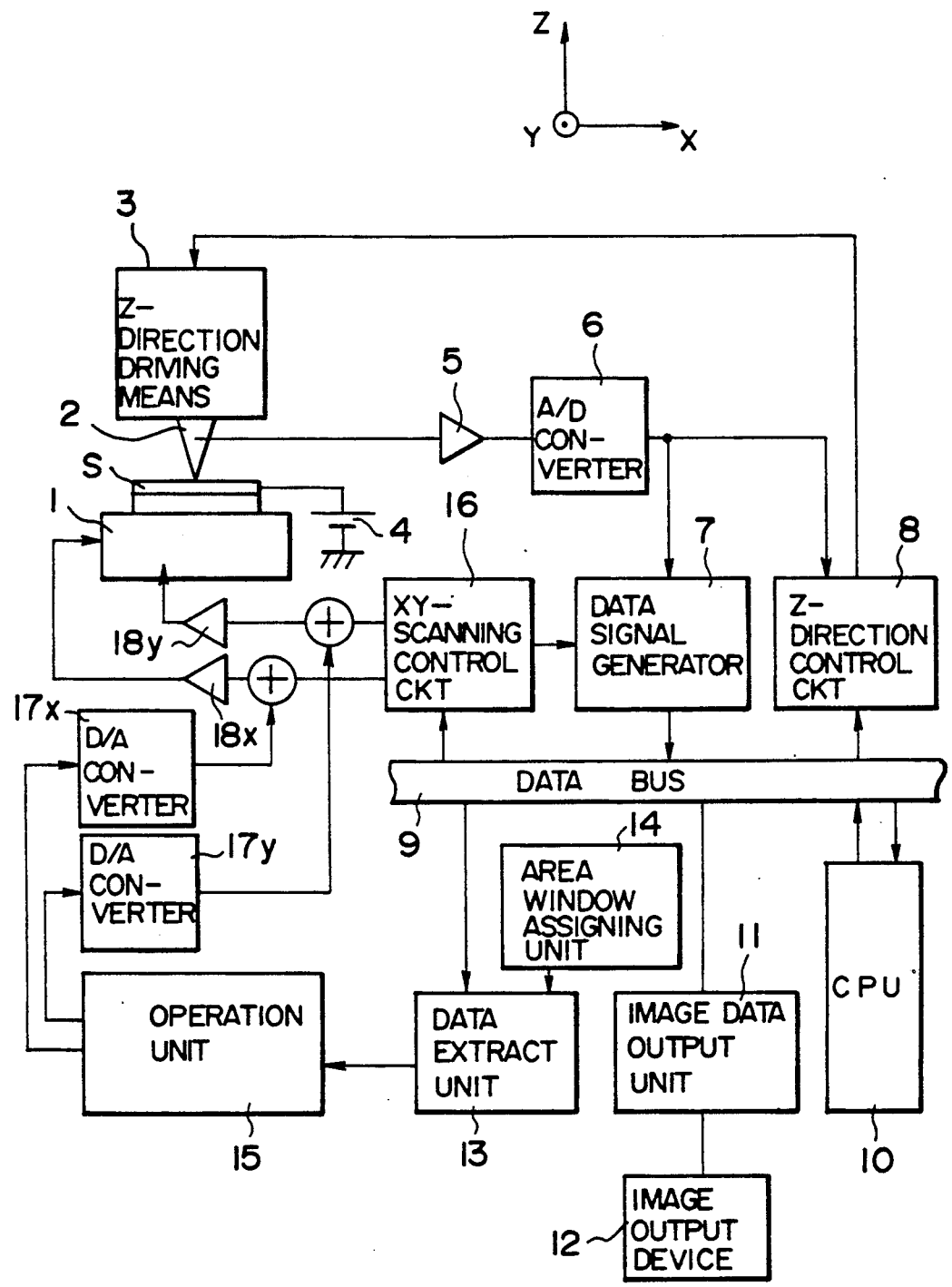
FIG. 1 is a block diagram showing the first embodiment of a scanning probe microscope of the invention.

The invention will be described in detail on the basis of the embodiments shown in the drawings.

FIG. 1 shows a block circuit constructional diagram of an embodiment in which the invention is applied to an STM. A sample S is fixed onto a stage 1 which can be driven in both X and Y directions. A probe 2 is arranged so as to face the sample S and is supported so as to be vertically movable by driving means 3 in a Z direction. A predetermined DC voltage is applied between the sample S and the probe 2 by a power source 4. A tunnel current which flows due to the applied voltage is converted into a voltage by an amplifier 5 and supplied to an analog/digital (A/D) converter 6. The A/D converter 6 converts the magnitude of tunnel current into a digital value at a predetermined sampling interval. An output signal of the A/D converter 6 is supplied to a data signal generator 7 and a Z-direction control circuit 8. The data signal generator 7 transmits the data of one line in the raster direction, namely, scanning direction to a data bus 9 as a data packet. The Z-direction control circuit 8 detects the distance between the probe 2 and the sample S from the magnitude of the tunnel current and feeds the detected distance back to control, and a control voltage which is applied to the piezoelectric actuator of the Z-direction driving means 3, thereby keeping the distance constant.

The data bus 9 is controlled by a CPU (central processing unit) 10. The data packet from the data signal generator 7 is converted into image data by an image data output unit 11 and sent to an image output device 12 comprising a monitor or the like. The same data packet is also sent to a data extract unit 13. The data extract unit 13 generates only the data in an area corresponding to the assignment of an area window assigning unit 14. An output signal of the data extract unit 13 is supplied to an operation unit 15. The operation unit 15 executes arithmetic operations, which will be explained hereinbelow, in accordance with flowcharts of FIGS. 2 and 3, and calculates moving amounts of the image for a previous screen with respect to both of the X and Y directions. The operation unit 15 further obtains and outputs feedback amounts in both the X and Y directions on the basis of the moving amounts. On the other hand, an XY-scanning control circuit 16 generates control voltages in both the X and Y directions by commands which are transmitted from the CPU 10 through the data bus 9. An output of the operation unit 15 is converted into analog voltages by digital/analog (D/A) converters 17x which are 17y and added to an output of the XY-scanning control circuit 16. After that, the resultant output signals are amplified by amplifiers 18x and 18y and applied to piezoelectric actuators in the X and Y directions of the stage 1, respectively.

In the above construction, the case where a gold electrode having a groove formed by a semiconductor process is used as a sample S and the image has been stopped in the X direction will be first described. A predetermined voltage is applied between the sample S and the probe 2. The tunnel current flowing between them due to the applied voltage is converted into the digital value by the A/D converter 6. The tunnel current data is collected as a data packet of the tunnel current data every raster by the data signal generator 7 and sent to the data bus 9. In this embodiment, one raster is constructed by 512 data and one screen is constructed by 512 rasters.

The Z-direction control circuit 8 controls the distance between the probe 2 and the sample S by applying a control voltage to a piezoelectric actuator attached to the Z-direction driving means 3. In this instance, the Z-direction control circuit 8 fetches the A/D converted tunnel current data and executes feedback control by using the tunnel current data as information indicative of the distance between the probe 2 and the sample S. The image data output unit 11 produces the image data by using the data packet received from the data bus 9 and supplies the STM image to the image output device 12 such as a monitor or the like. The XY-direction scans are performed by applying the control voltages which are generated from the XY-scanning control circuit 16 to the piezoelectric actuators attached to the stage 1. A series of operations are managed by the CPU 10 and the sample surface is observed by the respective operations.

Figure 2:
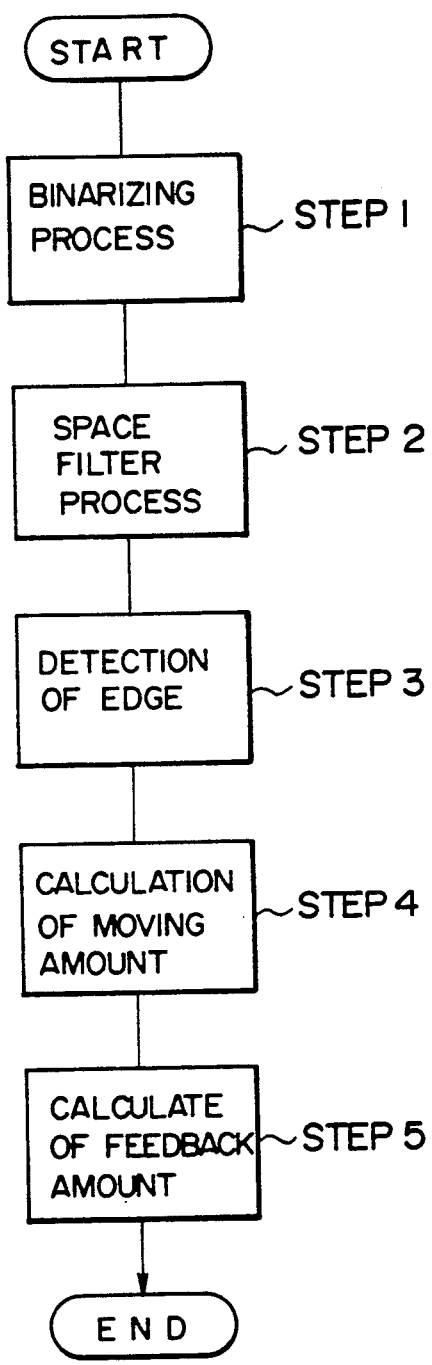
FIG. 2 is a flowchart showing an example of a processing procedure in an operation unit in the first embodiment.

The practical operation of an STM image stopping mechanism will now be described. First, a spatial change position of the tunnel current signal as a detection signal is effectively detected and a detection area is designated in order to execute the feedback control. A portion on the screen which is used as a detection area is determined by the area window assigning unit 14. The information of the area position is sent to the data extract unit 13. The data extract unit 13 extracts only the data in the area from the tunnel current data packet received from the data bus 9 and supplies the extracted data to the operation unit 15. As shown in the flowchart of FIG. 2, the operation unit 15 executes a binarizing process in the data in the area (STEP 1), a space filter process (STEP 2), a detection of the signal change position, namely, edge position from the results of the above processes (STEP 3), a calculation of the moving amounts (STEP 4), and a calculation of the feedback amount (STEP 5). Finally, the feedback amount is added to the output of the XY-scanning control circuit 16 and the scanning area is stopped for the sample surface.

Figure 4:
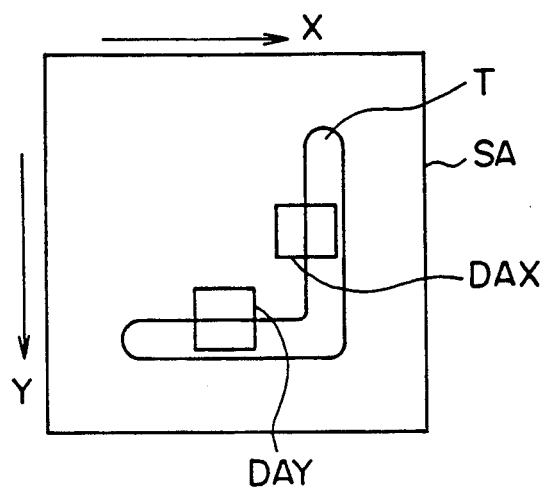
FIG. 4 is a diagram showing an example of a positioning mark formed on a sample.

As shown in FIG. 4, as a sample S used in the embodiment, a groove T having a width of 200 nm and a depth of 50 nm is formed on a gold substrate by a semiconductor process so as to have an L-shape and a vertical length of 1000 nm and a lateral length of 1000 nm. A size of scanning area SA is set to 2 $\mu m^2$ (corresponding to the tunnel current data of 512 × 512 pixels). The sizes of the X-direction detection area DAX and the Y-direction detection area DAY and each set to 250 $nm^2$ (corresponding to the tunnel current data of 64 pixels × 64). It is necessary to set the sizes of the detection areas DAX and DAY in a manner such that the position detecting edges in the X and Y directions are not deviated to the outside by the drift until the next detection, respectively.

Figure 5:
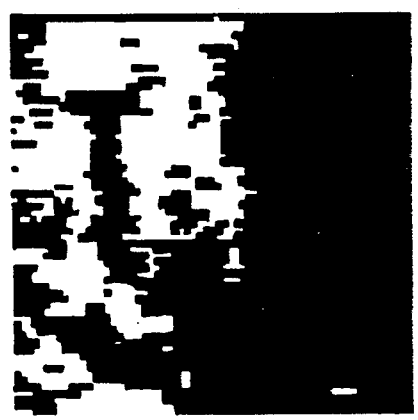
FIG. 5 is a diagram showing an example of an image pattern in an edge detection area.

A data processing procedure in the operation unit 15 in FIG. 1 will now be described in detail by using the control flowchart shown in FIG. 2 and the actual results of the arithmetic operations. FIG. 5 shows image data binarized by the operation circuit. Such image data is obtained by binarizing the data in the detection area using as a threshold a current of 1 nA. A black portion indicates the inside of the groove (bit=0; the portion in which the observation current is smaller than the threshold current) and the white portion indicates the outside of the groove (bit=1). The stop control is performed by a method whereby the boundary between the black and white portions is determined as a groove edge and this position is fixed by the feedback control. FIG. 5 shows the data of the detection area in the X direction. In this state, there are a number of small isolated points (noise) and the edge portion is unstable. Accuracy in the case where the stop control has been performed in such an image as it is lies within a range of from 20 to 30 nm.

Figure 6:
FIG. 6 is a diagram showing the image pattern after it passed through a space filter.

A two-dimensional filter is used in order to stabilize the binarization image. FIG. 6 shows the data after the two-dimensional filter process has been performed on the data of FIG. 5. Actually, a method whereby a space average is obtained by the size of data of 3×3 and the central bit is determined, is used. Due to this, it is possible to confirm that the isolated points are eliminated as shown in FIG. 6 and the edge is also stabilized. It has been confirmed that according to the stop control performed by using the above filter, the accuracy is raised by about a few times and lies within a range of from 5 to 8 nm, and thus, the effect of the filter is large.

Subsequently, a moving amount calculating method of the operation unit 15 will be described. Upon calculation of the moving amounts, the signal change position, namely, the groove edge position is first detected and the moving amount is calculated from the difference between the groove edge position and a target value. Referring now to FIG. 6, although no white portion exists in the black area of the right half, a black (small signal) area exists in the white area (out of the groove) of the left half. Therefore, attention is paid to the line in the lateral direction, how much the black portion continues from the right edge is measured, and a mean value regarding all of the lateral lines at that position is determined as an edge position.

In the present embodiment, a P control is used as a feedback control. The difference between the center of the detection area as a target position and the detected position is generated as a feedback amount, as it is. However, to execute a soft control of a higher accuracy, a PID control or a fuzzy control can be also used. For instance, by using the PID control, a moving speed for a gentle movement of a long period such as a temperature drift or the like can be made the object of the control and control of a higher accuracy can be realized. By using the fuzzy control, on the other hand, the time required until stabilization can be remarkably reduced by controlling returning speed in view of deviation amount. Further, by combining those two methods and devising the moving method, an image of higher accuracy can be obtained. For instance, when the scanning area is moved by the correction amount of one screen, not only the scanning area is moved by one step at a time but also the number of correction times is set to a plurality of times and the scanning area is finely moved by setting the movement amount of one screen to fine steps within a range from several tens of times to several hundreds of times, so that a flow and a distortion of the image can be suppressed for a constant gentle movement such as a thermal drift.

Although the stopping mechanism in the X direction has been described in is embodiment, by using the detection area DAY in the Y direction shown in FIG. 4, the edge position is detected and controlled in the Y direction in a manner similar to the X direction, so that the scanning area can be also stopped in the Y direction.

Figure 7:
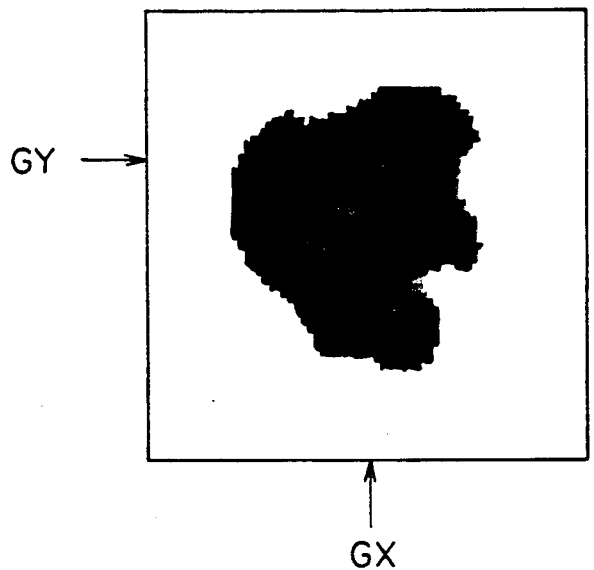
FIG. 7 is a diagram showing the image pattern after it passed through the space filter.

The second embodiment will now be described. In the first embodiment, it is necessary to artificially form the marker. However, in the second embodiment, a part of the image which is actually being observed can be used as a marker. The feedback mechanism is similar to that shown in FIG. 1 of the first embodiment. First, when the detection area is designated, an image or a part of the image of size which the area can be completely incorporated in the area, is selected as a marker. FIG. 7 shows the image in the case where the signal in the detection area has been binarized (STEP 11) and passed through the space filter (STEP 12). As mentioned above, the area (black portion) of small tunnel current forms a certain image and has a size such that it is included in the detection area.

Figure 3:
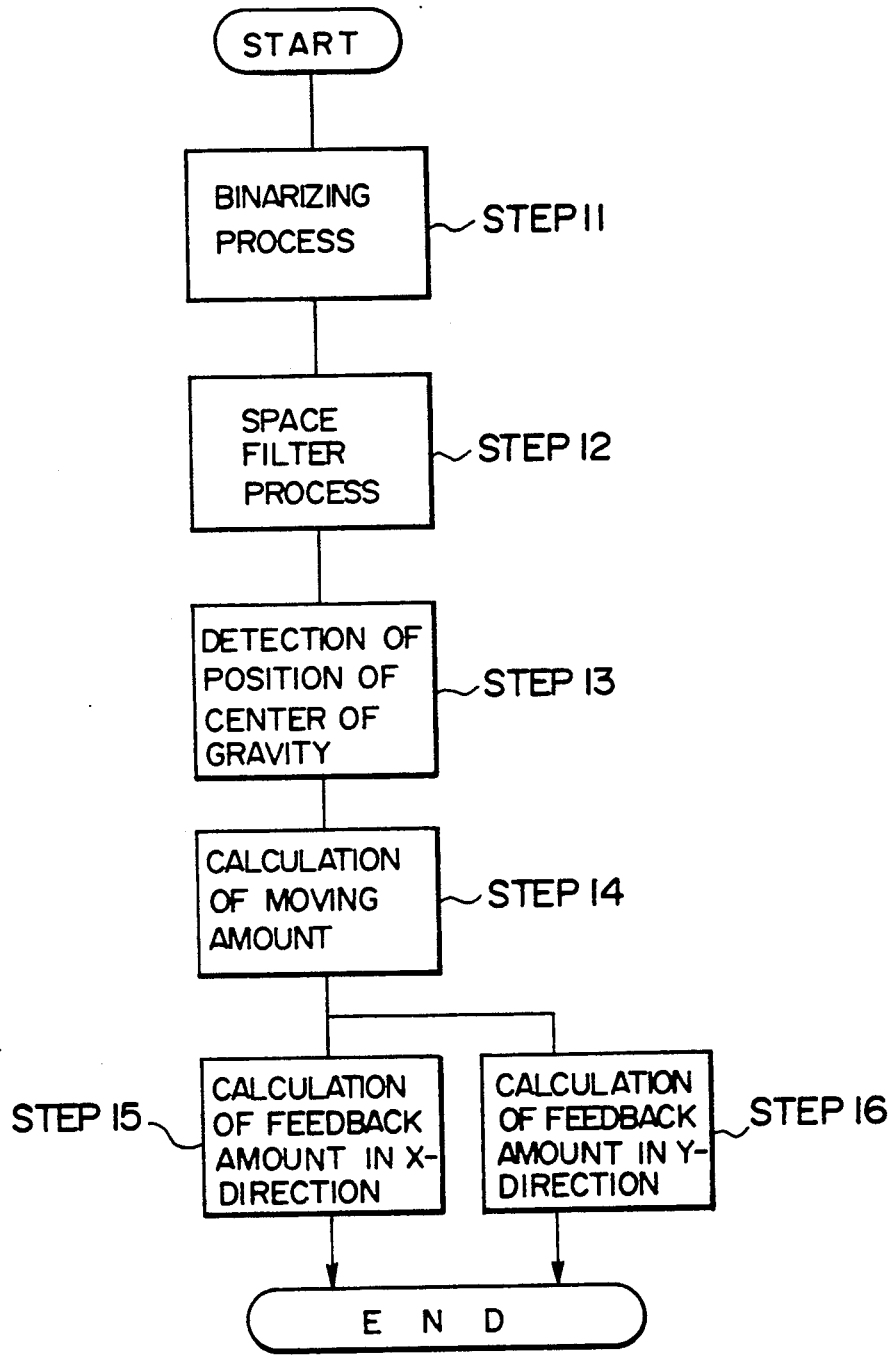
FIG. 3 is a flowchart showing another example of a processing procedure in the operation unit in the first embodiment.

A position of a center of gravity of this figure is obtained (STEP 13) as shown in the flowchart of FIG. 3. The moving amount is calculated from the change in position of the center of gravity (STEP 14). The feedback amount of the X direction is calculated (STEP 15). The feedback amount in the Y direction is calculated (STEP 16). By multiplexing the feedback amounts to the control signal which is supplied to the stage, a control is performed so as not to move the observation image.

The center of gravity is obtained as follows. First, the data of 64×64 pixels in FIG. 7 are calculated in the vertical direction, and a position GX of the lateral line at which the area is divided into halves is obtained. Similarly, the data are calculated in the lateral direction and a position GY of the vertical line at which the area is divided into halves is obtained. The position of the center of gravity (GX, GY) is obtained by the above two positions. By controlling such a position in both the X and Y directions so as to coincide with the target position, the STM image is stopped. By executing the P control by using the target position as a center of the detection area, the STM image could be simultaneously stopped in both of the X and Y directions at an accuracy of 2 nm.

According to this method, different from the first embodiment, by designating one detection area, the STM image can be simultaneously controlled with respect to both the X and Y directions. There is no need to artificially form the marker by using a semiconductor process or the like. Although the operator has designated the detection area, if the detection area is automatically designated by a computer such as a CPU 10 in FIG. 1, the need for such designating operation can be avoided.

Although the above embodiment relates to the STM, the invention can be also applied to an apparatus for observing a sample by using another physical amount between the sample and the probe, for instance, to an atomic force microscope (AFM).

Figure 8:
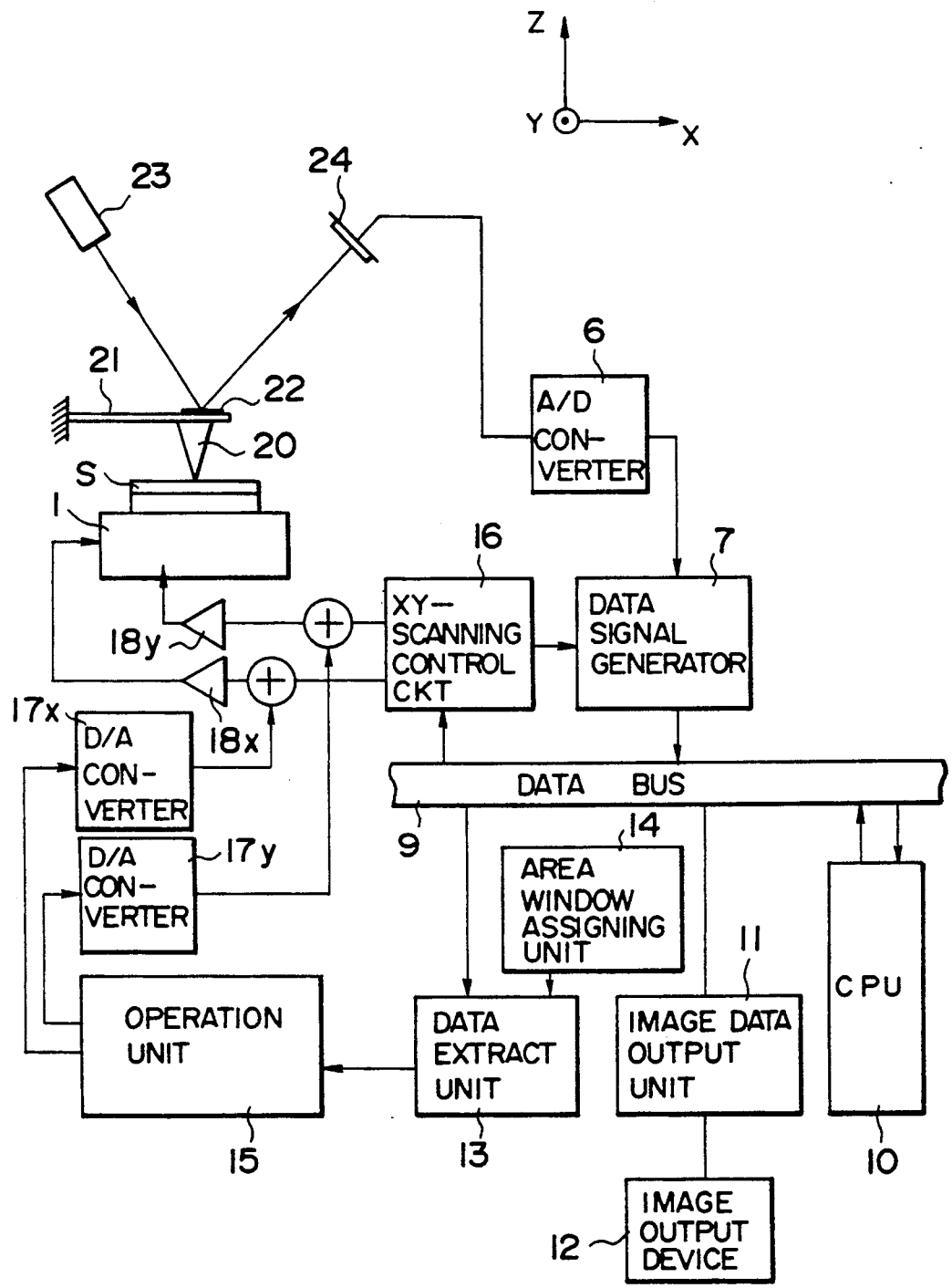
FIG. 8 is a block diagram showing the second embodiment of a scanning probe microscope of the invention.

FIG. 8 is a block diagram showing an embodiment in which the invention is applied to the AFM. In FIG. 8, the same component elements as those shown in FIG. 1 are designated by the same reference numerals and their detailed descriptions are omitted. In is embodiment, a probe 20 is supported by a cantilever 21 so that it can be deviated in the Z direction relative to the microscope main body. A mirror 22 is attached to the upper surface of the cantilever 21. A light beam from a light source 23 is irradiated to the mirror 22. The reflected light of the light beam from the mirror 22 is detected by a photodetector 24 having divided light receiving surfaces.

In the above construction, when the probe 20 is allowed to fairly approach the sample S, a repulsive force between atoms acts between the probe 20 and the sample S. In this state, when the sample S is moved in the X and Y directions by the stage 1, the probe 20 is vertically displaced so as to trace the concave and convex portions on the surface of the sample. In association with the displacement of the probe 20, the cantilever 21 is deformed and the angle of the mirror 22 for the light beam from the light source changes. Thus, the spot of the reflected light on the light receiving surface of the photodetector 24 is moved. Therefore, by detecting the movement of the light spot using the photodetector 24, the concave and convex shapes of the surface of the sample S can be known. The movement of the spot of the reflected light can be detected by, for instance, obtaining the difference between the output signals of the divided portions of the light receiving surface.

The signal corresponding to the structure of the sample detected as mentioned above is converted into the digital signal by the A/D converter 6. After that, the image is generated and the scanning area is corrected in a manner similar to the embodiment of FIG. 1. That is, the image data is generated by the image data output unit 11 from the data generated from the data signal generator 7 and transmitted through the data bus 9. The observation image is generated from the image output device 12 such as a cathode ray tube (CRT). On the other hand, in the data which is generated from the data signal generator 7, the data corresponding to the area designated by the area window assigning unit 14 is extracted by the data extract unit 13 and sent to the operation unit 15. In the operation unit 15, by a method as described in FIGS. 2 to 7, a correction signal to correct the shift of the image is produced and is fed back through the D/A converters 17x and 17y to the control signal which is supplied from the XY-scanning control circuit 16 to the stage 1.

Even in the case where the invention is applied to the AFM as mentioned above, the shift of the observation image is prevented in a manner similar to the case of the STM and the stable observation image is derived.

As described above, in the scanning probe microscope according to the invention, the drift of the STM image which is caused due to a change in relative position between the stage and the probe due to the temperature change, vibration, creeping of the piezoelectric actuators, or the like can be eliminated. Therefore, the same area can be observed for a long time. Particularly, there is an advantage in that the movement of the image due to temperature change, relaxation of the mechanical system, or the like just after the start of the observation, is suppressed, and the image can be observed in a stable state. On the other hand, by detecting the signal change position by designating the area, if there is a portion whose time-dependent change is small even in only a part of the screen, such a portion can be designated as a detection area. For instance, the invention can be also applied to observation having observations which are subject to a time-dependent change during a crystal growing process of silicon or the like or growing process of a thin metal film by MBE or the like.

What is claimed is:

1. A scanning probe microscope comprising:
    a probe arranged to face a surface of a sample;
    scanning means for two-dimensionally scanning the surface of the sample using said probe;
    detecting means for detecting a signal corresponding to a structure of the sample from said probe;
    output means for outputting an observation image of the sample form the signal detected by said detecting means; and
    correcting means for correcting scanning by said scanning means so that the observation image which is generated from said output means is not shifted, wherein said correcting means further comprises a designating circuit for designating a partial area of the observation image, a data extracting circuit for extracting only a signal corresponding to the area designated by said designating circuit from an output signal from said detecting circuit, an operation circuit for calculating a shift amount by comprising an image pattern produced on the basis of the signal extracted by said extracting circuit with a reference value, and a feedback circuit for feeding a correction signal corresponding to the shift amount back to said scanning means.

2. A microscope according to claim 1, wherein said detecting means applies a voltage between said probe and the sample and extracts a tunnel current flowing in the probe to produce the output signal from said detecting means.

3. A microscope according to claim 2, wherein said output means further comprises a digital/analog converter for sampling a magnitude of the tunnel current extracted by said detecting means at predetermined time intervals and for generating a digital signal, and an image data output circuit for converting the digital signal into image data.

4. A microscope according to claim 3, wherein said output means further comprises a monitor to generate the image on the basis of the image data.

5. A microscope according to claim 1, wherein said detecting means further comprises means for detecting a motion of said probe due to a force between atoms which acts between said probe and the sample.

6. A microscope according to claim 1, wherein said correcting means comprises a circuit to binarize the signal extracted by said data extracting circuit and a space filter for filtering an output of said binarizing circuit and supplying the filtered output to said operation circuit.

7. A microscope according to claim 1, further comprises:
    driving means for driving said probe in the direction perpendicular to the sample surface; and
    control means for controlling said driving means so as to keep said distance between the probe and the sample surface constant.

8. A scanning probe microscope comprising:
    a probe arranged to face a surface of a sample;
    driving means for effecting two-dimensional relative movement between said probe and the sample;
    a control circuit for outputting a control signal for controlling said driving means;
    a detecting circuit for detecting a signal corresponding to a structure of the sample from said probe;
    a data producing circuit for producing a image data of the sample form the signal detected by said detecting circuit;
    a designating circuit for designating a partial area of the image;
    a data extracting circuit for extracting only data corresponding to the area designated by said designating circuit form among data produced by said data producing circuit;
    an operation circuit for detecting a shift of the image by comparing the data extracted by said data extracting circuit with a reference value and for outputting a correction signal for correcting the shift; and
    a feedback circuit for feeding the correction signal back to the control signal to be input to said driving means for said control circuit.

9. A microscope according to claim 8, further comprising a power source to apply a voltage between said probe and the sample, and wherein said detecting circuit detects a tunnel current flowing in said probe.

10. A microscope according to claim 9, further comprising a digital/analog converter for producing a digital signal by sampling a magnitude of the tunnel current detected by said detecting circuit at predetermined time intervals and for supplying the digital signal to said data producing circuit.

11. A microscope according to claim 8, further comprising an image output device for generating an image on the basis of the image data produced by said data producing circuit.

12. A microscope according to claim 8, wherein said detecting circuit comprises means for detecting a motion of said probe due to a force between atoms which acts between said probe and the sample.

13. A microscope according to claim 8, wherein said operation circuit converts the data extracted by said data extracting circuit into a binarized image pattern and compares the image pattern with the reference value, thereby detecting the image shift.

14. A microscope according to claim 13, wherein said operation circuit filters the binarized image pattern and, thereafter, compares with the reference value.

15. A microscope according to claim 8, further comprising:
second driving means for driving said probe in the direction perpendicular to the sample surface; and
another control means for controlling said second driving means so as to keep the distance between the probe and the sample surface constant.

16. A method of observing a sample using a scanning probe microscope, comprising the steps of:
two-dimensionally scanning a surface of a sample with a probe;
detecting a signal corresponding to a structure of the sample from the probe;
obtaining an observation image of the sample from the detected signal; and
correcting scanning of the surface so that the observation image is not shifted, wherein said correcting step is performed such that a partial area of the observation image is designated, to extract only a signal corresponding to the area designated from the detected signal, and an image pattern produced on the basis of the extracted signal is compared with a reference value, so that a shift amount of the image is calculated to effect feedback control on the basis of the shift amount.

17. A method according to claim 16, further comprising the step of applying a voltage between the probe and the sample, and wherein the signal is detected as a tunnel current flowing in the probe.

18. A method according to claim 17, wherein in said step of obtaining the observation image, a magnitude of the tunnel current is sampled at predetermined time intervals and converted into a digital signal, the digital signal is converted into the image data, and the image is obtained on the basis of the image data.

19. A method according to claim 16, wherein the signal is derived by detecting the motion of the probe by a force between atoms which acts between the probe and the sample.

20. A method according to claim 16, wherein in said correcting step, the extracted signal is further binarized and the binarized signal is filtered, thereby producing the image pattern.

21. A method according to claim 16, further comprising the step of controlling so as to keep the distance between the probe and the sample surface constant.

22. A method of observing a sample using a scanning probe microscope, comprising the steps of:
effecting two-dimensional relative movement between a probe and a sample in accordance with a control signal;
detecting a signal corresponding to a structure of the sample from the probe;
producing image data of the sample from the detected signal;
binarizing at least a part of the image data;
filtering the binarized data;
converting the filtered data into an image pattern;
detecting a shift of the image by comparing the converted image pattern with a reference value;
generating a correction signal for correcting the detected shift; and
feeding the correction signal back to the control signal.

23. A method according to claim 22, further comprising the step of applying a voltage between the probe and the sample, and wherein the signal is detected as a tunnel current flowing in the probe.

24. A method according to claim 23, wherein in said step of producing the image data, the digital signal is produced by sampling a magnitude of the detected tunnel current at predetermined time intervals and the image data is produced from the digital signal.

25. A method according to claim 22, further comprising the step of generating the image on the basis of the image data.

26. A method according to claim 22, wherein the signal is derived by detecting a motion of the probe due to a force between atoms which acts between the probe and the sample.

27. A method according to claim 22, further comprising the step of controlling so as to keep the distance between the probe and the sample surface constant.

28. A scanning probe microscope comprising:
a probe arranged to face a surface of a sample;
scanning means for two-dimensionally scanning the surface of the sample using said probe;
detecting means for detecting a signal corresponding to a structure of the sample form said probe;
output means for outputting an observation image of the sample from the signal detected by said detecting means; and
correcting means for correcting scanning by said scanning means so that the observation image output from said output means is not shifted, wherein said correcting means further comprises a binarizing circuit for binarizing at least a part of the signal detected by said detecting means, a space filter for filtering an output from said binarizing circuit, an operation circuit for calculating a shift amount by comparing an image pattern produced on the basis of the signal filtered by said space filter with a reference value, and a feedback circuit for feeding the correction signal corresponding to the shift amount back to said scanning means.

29. A scanning probe microscope according to claim 28, wherein said detecting means applies a voltage between said probe and the sample and extracts a tunneling current flowing in said probe.

30. A scanning probe microscope according to claim 29, wherein said output means further comprises a digital/analog converter for sampling a magnitude of the tunneling current extracted by said detecting means at predetermined time intervals and for generating a digital signal, and an image data output circuit for converting the digital signal into an image data.

31. A scanning probe microscope according to claim 30, wherein said output means further comprises a monitor for outputting an image on the basis of the image data.

32. A scanning probe microscope according to claim 28, wherein said detecting means further comprises means for detecting movement of said probe due to an interatomic force acting between said probe and the sample.

33. A scanning probe microscope according to claim 28, fruther comprising driving means for driving said probe in a direction perpendicular to the surface of the sample and control means for controlling said driving means so as to keep the distance between said probe and the sample surface constant.

34. A scanning probe microscope comprising:
a probe arranged to face a surface of a sample;
driving means for effecting two-dimensional relative movement between said probe and the sample;
a control circuit for outputting a control signal for controlling said driving means;
a detecting circuit for detecting a signal corresponding to a structure of the sample from said probe;
a data producing circuit for producing image data of the sample form the signal detected by said detecting circuit;
a binarizing circuit for binarizing at least a part of the data produced by said data producing circuit;
a space filter for filtering an output form said binarizing circuit;
an operation circuit for calculating a shift amount by comparing an image pattern produced on the basis of a signal filtered by said space filter with a reference value; and
a feedback circuit for feeding a correction signal corresponding to the shift amount calculated by said operation circuit back to the control signal to be input to said driving means form said control circuit.

35. A scanning probe microscope according to claim 34, further comprising a power source for applying a voltage between said probe and the sample, wherein said detecting means detects a tunneling current flowing in said probe.

36. A scanning probe microscope according to claim 35, further comprising a digital/analog converter for producing a digital signal by sampling a magnitude of the tunneling current detected by said detecting circuit at predetermined time intervals and for supplying said digital signal to said data producing circuit.

37. A scanning probe microscope according to claim 34, further comprising an image output device for outputting an image on the basis of the image data produced by said data producing circuit.

38. A scanning probe microscope according to claim 34, wherein said detecting circuit further comprises means for detecting movement of said probe due to an interatomic force acting between said probe and the sample.

39. A scanning probe microscope according to claim 34, further comprising additional driving means for driving said probe in a direction perpendicular to the sample surface and additional control means for controlling said additional driving means so as to keep the distance between said probe and the sample surface constant.

* * * * *

UNITED STATES PATENT AND TRADEMARK OFFICE
CERTIFICATE OF CORRECTION

PATENT NO. : 5,323,003
DATED : June 21, 1994
INVENTOR(S) : SHUNICHI SHIDO, ET AL.

It is certified that error appears in the above-identified patent and that said Letters Patent is hereby corrected as shown below:

ON TITLE PAGE

In [56] References Cited, under OTHER PUBLICATIONS:
"Physics Oeta, vol. 55," should read
--Physics Acta, vol. 55, No. 6,--.

COLUMN 1

Line 20, "phenomenon" should read --phenomenon,--.

COLUMN 3

Line 17, "and" should be deleted.
Line 33, "of" should be deleted.
Line 42, "17x which are 17y and" should read
--17x and 17y which are--.

COLUMN 4

Line 40, "64 pixels x64)." should read --64x64 pixels).--.

COLUMN 5

Line 63, "of" (second occurrence) should read --of a--.

COLUMN 6

Line 47, "is" should read --this--.

COLUMN 7

Line 45, "observation having" should be deleted.

UNITED STATES PATENT AND TRADEMARK OFFICE
CERTIFICATE OF CORRECTION

PATENT NO. : 5,323,003
DATED : June 21, 1994
INVENTOR(S) : SHUNICHI SHIDO, ET AL.

Page 2 of 2

It is certified that error appears in the above-identified patent and that said Letters Patent is hereby corrected as shown below:

COLUMN 8

Line 1, "comprising" should read --comparing--.
Line 48, "a" (second occurrence) should read --an--.
Line 64, "for" should read --from--.

COLUMN 11

Line 27, "form" should read --from--.
Line 32, "form" should read --from--.

Signed and Sealed this

Twenty-second Day of November, 1994

Attest:

BRUCE LEHMAN

Attesting Officer

Commissioner of Patents and Trademarks